Feb. 18, 1964  L. C. PRATT ETAL  3,121,813
ELECTRIC POWER UNIT
Filed Nov. 15, 1960  2 Sheets-Sheet 1
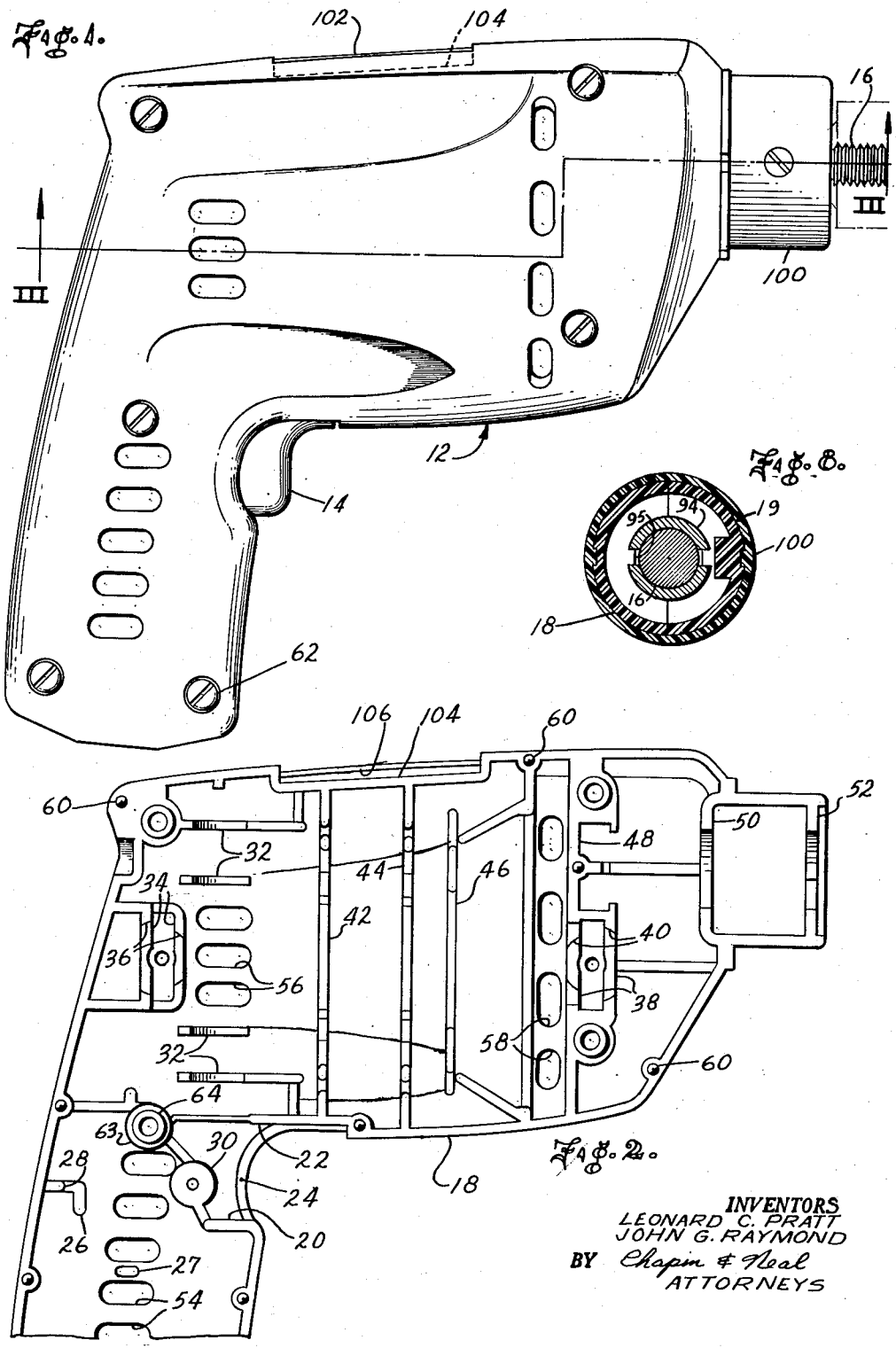
INVENTORS
LEONARD C. PRATT
JOHN G. RAYMOND
BY Chapin & Neal
ATTORNEYS

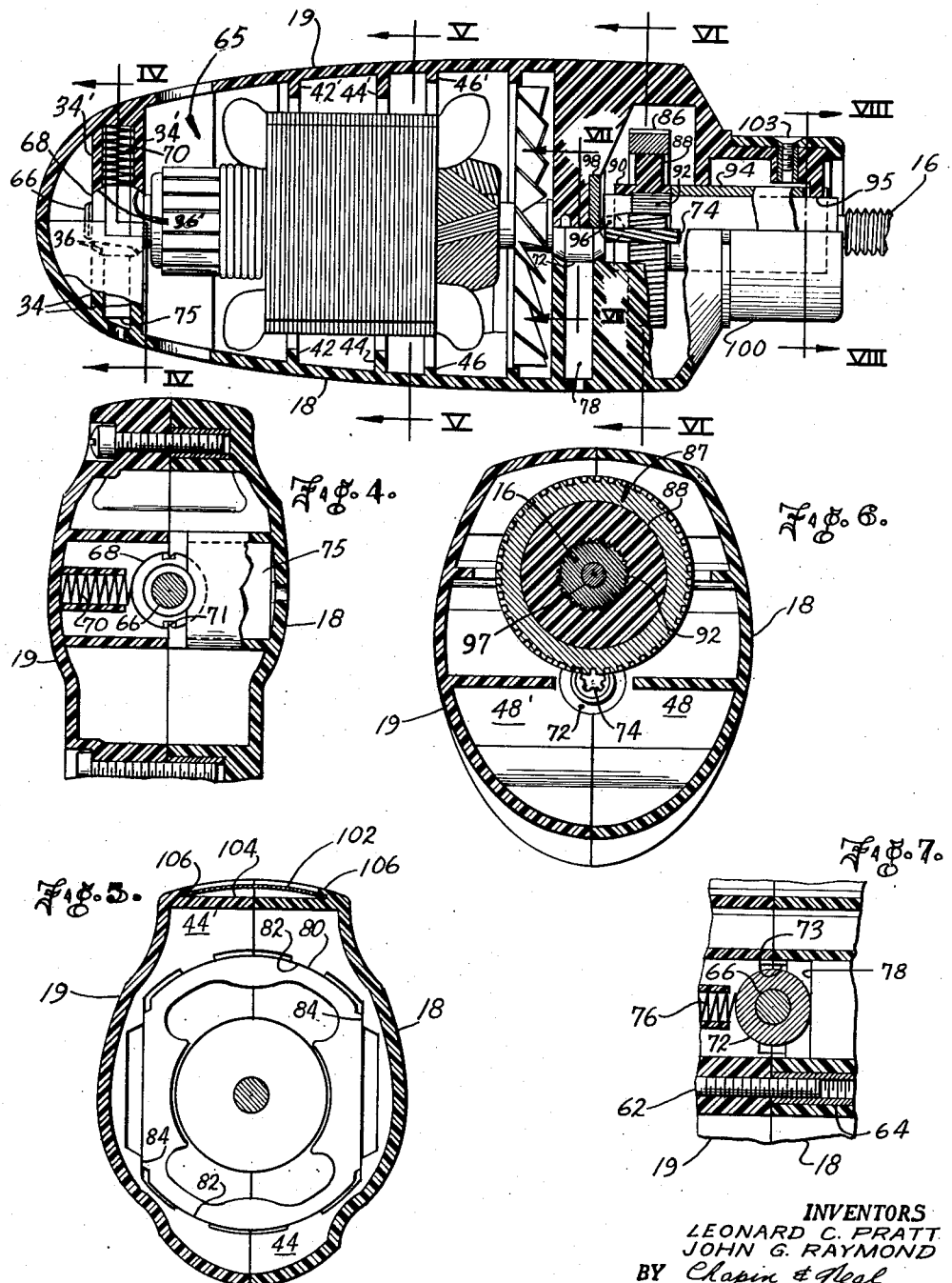

United States Patent Office 3,121,813
Patented Feb. 18, 1964

3,121,813
ELECTRIC POWER UNIT
Leonard C. Pratt and John G. Raymond, Greenfield, Mass., assignors, by mesne assignments, to Millers Falls Company, Greenfield, Mass., a corporation of Massachusetts
Filed Nov. 15, 1960, Ser. No. 69,437
3 Claims. (Cl. 310—50)

The present invention relates to improvements in portable electric power units commonly known as electric drills even though a wide variety of driven elements are powered thereby other than the ordinary twist drill used for forming holes.

These power units, particularly the so-called ¼" drill, have in recent years enjoyed a tremendous commercial success and form the backbone of the "do-it-yourself" era. Such drills or power units had previously found and continue to enjoy widespread use in industrial applications not only in the ¼" size but also in larger sizes of portable units.

The hazard of electrical shock and possible electrocution in using such power units has long been apparent to industrial users, particularly because of the concentrated safety programs which are carried out in conjunction with the workmen's compensation programs. This has led many employers to specify that the conventional metal housings of such power units be grounded while in use. In a large number of industrial plants electrical receptacles are provided with a separate grounding connection so that the power unit may be connected to a standard single phase current source, and a third connection, for the housing, made to ground by way of a three-conductor cable leading to the power unit.

Other industrial users have sheathed the conventional metal casing of the power units with an insulation as an alternative or even as a supplement to the use of a grounding wire.

While this need for safety precautions has long been recognized, the do-it-yourselfer has continued to use these power units under hazardous conditions. This unfortunate condition exists partly because of the great competition which deters adding features which would increase cost and partly because of the almost universal lack of electrical receptacles having a ground connection, in the ordinary house.

The object of the invention is to economically provide an improved electric power unit which doubly insulates the user from any electrical shock and thereby eliminates the need for any separate ground connection. The term "doubly insulated" is herein used to signify that while all electrical conductors for the power unit are covered with "primary" insulation in the usual sense, all portions of the drill which may contact the user are nonconductive or are separated from the electricity carrying conductors by a second insulator. Thus, even in the event of part or total failure of any or all primary insulation, the user is not exposed to the hazard of electrocution or electrical shock.

Another object of the invention is to provide an improved plastic drill housing or power unit housing particularly characterized in that the bearings of the electric motor therefor are able to adjust or compensate for any dimensional variations as a result of temperature changes or working stresses and thereby prevent the motor from binding or operating below its normal efficiency as well as to insure at least normal bearing life.

Yet another object of the invention is to provide improved means for mounting nameplates or the like on plastic drills.

A further object is to provide an improved driving spindle for use in attaining the above ends and a method of making same.

The above and other related objects, as well as the novel features of the invention will be apparent from a reading of the following description of the disclosure found in the accompanying drawings and the novelty thereof pointed out in the appended claims.

In the drawings:

FIG. 1 is an elevation of a power unit embodying the present invention;

FIG. 2 is an elevation of one frame comprising the housing thereof;

FIG. 3 is a section taken generally on line III—III in FIG. 1;

FIG. 4 is a section taken on line IV—IV in FIG. 3;

FIG. 5 is a section taken on line V—V in FIG. 3;

FIG. 6 is a section taken on line VI—VI in FIG. 3;

FIG. 7 is a fragmentary section taken on line VII—VII in FIG. 3; and

FIG. 8 is a section taken on line VIII—VIII in FIG. 3.

The power unit of the present invention comprises an electric motor (not seen in FIG. 1) mounted in a housing 12 having a pistol grip of the usual configuration and a trigger 14 for actuating a switch (not shown) to start and stop the power unit and power whatever tool is attached to the output spindle 16. From its external configuration the present power unit cannot be distinguished from conventional power units of the so-called ¼" drill variety. However, as will be more fully apparent from the description hereinafter given, the present power unit is doubly insulated at all points which may contact the user. Briefly these ends are attained by the housing 12 and trigger 14 being formed of plastic material, while the metallic spindle 16 is separated from the armature of the power unit motor by an insulating barrier of dielectric material.

The housing 12 is longitudinally separable and comprises two shells which are referred to as a frame 18 and a cover 19. The frame and the cover are mirror images in exterior appearance and are approximately so in interior configuration. The interior of the frame shell 18 may be seen in FIG. 2. The trigger 14 and the switch associated therewith are vertically captured by ribs 20 and 22 while being laterally confined by surfaces 24, 26 and 27 with a rib surface 28 preventing rearward movement thereof. A post 30 provides a sliding journal for a pin which will lock the trigger with the switch in its on position.

Grooved ribs 32 provide means for mounting the electrical brushes for the motor. Spaced ribs 34 provide one half of a spherical seat 36 for a bearing at one end of the armature shaft for the motor, while ribs 38 provide one half of a spherical seat 40 for a bearing at the other end of the armature shaft. Ribs 42, 44 and 46 provide a cradle for supporting the field or stator of the motor.

A rib 48 which comprises in part the rib 38 forms a barrier defining a gear chamber at one end of the frame. Ribs 50 and 52 provide a seat for an elongated bearing for the output spindle 16.

It will be noted that in most all parts the wall thickness of the shells is maintained uniform to provide dimensional stability and minimize shrinkage problems in the molding thereof. It will also be seen that vent openings 54 are provided in the handle portion of the frame 18 and other vent openings 56 and 58 are provided in the main portion thereof. The cover 19 is substantially a counterpart of the frame 18 with certain exceptions which will be noted and like parts will be identified with primed reference characters. The frame 18, for example, has integrally molded locating pins 60 which are received by corresponding holes in the frame 19 to assure matching of the two shells forming the housing 12. The two shells of the housing are held together by screws 62 (FIG. 1) which pass through counterbored holes in the frame 19 and are threaded into metal inserts 64 (FIGS. 2 and 4). The inserts 64 are press-fitted into blind holes formed in posts 63 on the frame 18 and may have enlarged heads (not shown) if desired.

Referring now to FIGS. 2, 3 and 4 it will be seen that the motor comprises an armature 65 and an armature shaft 66 which is journaled at its rear end in a bearing 68. The bearing 68 is formed with spherical portions which are received by the spherical seat portions 36, 36' formed in the frame 18 and cover 19. It will be seen that one of the ribs 34 and 34' on the frame 18 and the cover 19 are cut away to provide ventilation around the bearing 68 without entirely destroying the seat 36 formed therein. When the frame 18 and cover 19 are clamped together by the screws 62 the seat portions 36, 36' loosely clamp, if they clamp at all, the bearing 68 so that the bearing 68 is free to rotate or center itself on the composite seat 36, 36'. In order to prevent shucking of the bearing 68, a spring 70 is provided which yieldingly urges the bearing 68 against the seat 36 in the frame 18. An oil felt 75 is disposed between the ribs 34 on the frame 18 and an oil hole provided adjacent thereto so that oiling of the bearing 68 is a simple matter. Catches 71 are formed at the upper end of the seat 36 on one of the ribs 34 and enter notches formed in the bearing 68 to prevent rotation of the bearing.

The armature 65 is of standard construction and comprises the usual winding and commutator which is engaged by the brushes mounted on the ribs 32 (seen only in FIG. 2). Conventionally a fan is mounted on the armature shaft 66. Adjacent thereto a front bearing 72 supports the front end of the shaft 66, and is mounted in a manner quite similar to that of the rear bearing 68. Inasmuch as the bearing 72 may swivel freely in the portions 40, 40' (FIGS. 3 and 7) a spring 76 is provided to prevent shucking movement of the bearing 72 relative to the spherical seat therefor. Likewise, a felt 78 is provided to facilitate oiling of the bearing 72. Also the rear rib 38 and 38' of the frame 18 and the cover 19 are cut away at 73 to provide ventilation for the bearing 72.

The field or stator 80 of the electric motor is also of conventional construction and is preferably supported by locating pads 82 formed on the ribs 42, 42', 44, 44' and 46, 46' (FIGS. 3 and 5). It will also be seen that ledges 84 prevent the stator 80 from rotating relative to the housing 10.

A spiral gear 74 is formed on the forward end of shaft 66 and meshes with a gear 86 which in turn drives the spindle 16. The gear 86 is formed on an annular metal ring (FIGS. 3 and 6) which is drivingly connected to the spindle 16 by a plastic dielectric member 87 comprising a web portion 88 and a hub portion 90. The ribs 48, 48' define the inner end of a gear case which will preferably be filled with a lubricant for the gears 74 and 86.

The bore or inner diameter of the hub portion 90 matches or is slightly smaller than the diameter of the spindle 16. Straight knurling 92 is formed on the spindle 16 with a length approximating half the length of the hub portion 90. The plastic member 87 is telescoped over and forced onto the end of the spindle 16 with the knurling 92 cold forming the plastic material defining a portion of the bore of the hub portion 90. Thereafter, in manufacture, the spindle 16 is placed on centers or otherwise chucked and the outer diameter of the web portion 88 is machined concentrically of the axis of the spindle 16. The annular metal ring comprising the gear 86 is then telescoped over the plastic web portion 88 and maintained in driving relation thereon by the force or interference fit therebetween.

It will be apparent that the spindle 16 is insulated by the plastic member 87 from the armature of the power unit motor. Thus if there should be any breakdown of the primary insulation which in some manner would cause the armature shaft 66 to be "hot," the spindle 16 would be protected by the secondary insulation of the member 87 so that there would be no danger of the user getting an electric shock from contacting the spindle or any element attached thereto or driven thereby.

At this point it will be noted that the plastic member 87 is formed of a polycarbonate plastic resin which is characterized by its high strength, chemical inertness and high coefficient of friction. A suitable polycarbonate is Lexan available from the General Electric Company. The high coefficient of friction enables the plastic material to form a driving connection with the annular metal ring comprising the gear 88 without any knurling or splines which would increase the cost of the assembly and make more difficult the obtaining of concentricity for the gear 86.

The spindle 16 is journaled in a sleeve bearing 94 which is mounted in the ribs 50 and 52 at the front end or nose of the housing 12. The frame 18 and cover 19 are respectively provided with lugs 95 which enter notches in the end of bearing 94 to prevent its rotation and also to prevent the spindle from being pulled from the housing.

The front end or nose section of the housing is held together by an elongated ring 100 (FIGS. 3 and 8) which is held in place by a screw 103 threaded into the cover 19 or, more specifically, a metal insert provided in the cover 19. A keyed connection is provided between the ring 100 and shells 18 and 19 (as seen in FIG. 8) to prevent relative rotation of the ring.

Referring again to FIG. 3, it will be seen that the rear end of the spindle 16 is recessed to receive a hardened thrust washer 97 and a ball 96 while the rib 48 is provided with a socket for positioning a metal disc 98. The disc 98, the thrust washer 97 and ball 96 provide a thrust bearing for the spindle 16 to withstand any substantial rearward thrust on the spindle 16 as it is in use.

One further feature to be noted is the manner of mounting the metal nameplate 102 which is required to give the rating, voltage, etc., for the motor. The housing shells compositely form a recess 104 (FIGS. 1 and 5) having an outline matching that of the plate 102 and undercut portions 106 which maintain the plate 102 in place. When the frame 18 and cover 19 are separated the plate may be removed, replaced or installed originally.

The frame 18 and cover 19 of the housing 12 are preferably formed of nylon plastic, such Zytel #31 available from the E. I. du Pont de Nemours & Co., Inc. This plastic is selected because of its good molding qualities and because of its high impact strength and also because of its relative high dimensional stability under varying heat and moisture or humidity conditions. In spite of the high standards which this plastic material has reached, it is impossible to obtain from this or any other commercial plastic material, rigidity even faintly approximating the rigidity of a metal housing as used in conventional power units. This is particularly true when using the thin wall sections seen in the drawings which at least approximate a full scale showing of a ¼" drill.

This factor is mentioned in view of the fact that the bearings of a conventional drill remain unchanged, once they are aligned and to point up the importance of the bearings 68 and 72 for the armature shaft 66 and particularly the manner in which they are mounted. Since the bearings 68 and 72 are mounted in spherical seats either end of the shaft 66 may be shifted in any direction and the bearings 68 and 72 will automatically realign themselves for perfect bearing action throughout their length. It is not contemplated that the bearings will move to any great extent, but a lateral shifting of even a few thousandths of an inch, and the same misalignment of one bearing relative to another would result in rapid bearing wear or possibly an actual binding of the armature shaft if alignment of the bearings was not obtained. The described bearing arrangement overcomes the problems of using plastic material to support the armature shaft, where the plastic material will give or deflect to a substantial amount while in use, even though it would still be considered rigid, as opposed to a material such as low molecular weight polyethylene.

The mounting of the spindle 16 in a single sleeve bearing is preferred since it obviates any problems which might arise from a shifting of the plastic material supporting the spindle.

The plastic material for the ring 100 at the nose piece of the housing is preferably Delrin, a thermoplastic material available from E. I. du Pont de Nemours Co., Inc. This material is preferred because of its high strength and impact resistance, though it would be apparent that the nose piece is fully insulated by secondary insulation from any electrical conductor so that this piece could be made of metal if desired.

On the other hand the gap between the armature and field is sufficient to accommodate any normal shifting of the armature due to dimensional variations arising from the use of plastic.

Having thus described the invention what is claimed as novel and is desired to be secured by Letters Patent of the United States is:

1. A power unit comprising an electric motor having an armature shaft, a bearing supporting said shaft at each end of the motor and said shaft having an outer end with a gear formed thereon, a plastic housing enclosing said motor and comprising a pair of longitudinally separable shells having ribs compositely forming a pair of spaced spherical seats, the ribs adjacent each end of each shell forming half of each spherical seat with each seat half formed by a pair of longitudinally spaced ribs, the said bearings being respectively received in said seats and having surfaces matching the surfaces of the seats for universal swivelling movement relative thereto, whereby the bearings will be automatically aligned both initially and in the event of any shifting thereof due to give of the plastic material, the said housing shells being further provided with ribs forming an internal gear chamber in which said armature gear end of said shaft is received and an elongated nose portion, a sleeve bearing mounted in said nose portion and a spindle journaled in said bearing and extending into said gear chamber, a gear mounted on said spindle and in mesh with said armature gear, said spindle gear having a dielectric member electrically insulating the gear from the spindle and providing the driving connection therebetween.

2. A power unit as in claim 1 wherein the spindle has straight knurling and the dielectric member is telescoped thereover and further wherein the spindle gear comprises a metal ring fitted over the dielectric member.

3. A power unit comprising an electric motor having an armature shaft, a bearing supporting said shaft at each end of the motor and said shaft having an outer end with a gear formed thereon, a plastic housing enclosing said motor and comprising a pair of longitudinally separable shells having ribs compositely forming a pair of longitudinally spaced bearing seats, the ribs adjacent each end of each shell forming half of each seat, and the said bearings being respectively received in said seats, the said housing shells being provided with ribs forming a gear chamber in which said armature gear end of said shaft is received and having a nose portion, a bearing mounted in said nose portion and a spindle journaled in said bearing and extending into said chamber, a gear mounted on said spindle and in mesh with said armature gear, said spindle gear having a dielectric member electrically insulating the gear from the spindle and providing the driving connection therebetween.

References Cited in the file of this patent

UNITED STATES PATENTS

| | | |
|---|---|---|
| 2,123,265 | Wattie | July 12, 1938 |
| 2,151,435 | Neracher | Mar. 21, 1939 |
| 2,264,033 | Youhouse | Nov. 25, 1941 |
| 2,277,264 | Youhouse | Mar. 24, 1942 |
| 2,307,129 | Hines et al. | Jan. 5, 1943 |
| 2,777,963 | Kuntz | Jan. 15, 1957 |
| 2,935,804 | Duckro | May 10, 1960 |
| 2,965,774 | Rangus | Dec. 20, 1960 |